(12) United States Patent
Ogata et al.

(10) Patent No.: US 7,879,948 B2
(45) Date of Patent: Feb. 1, 2011

(54) FLUORINE CONTAINING ELASTOMER COMPOSITION AND MOLDED ARTICLE COMPRISING THE SAME

(75) Inventors: Shintarou Ogata, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 522 days.

(21) Appl. No.: 11/630,795

(22) PCT Filed: Jun. 24, 2005

(86) PCT No.: PCT/JP2005/011596

§ 371 (c)(1),
(2), (4) Date: Dec. 27, 2006

(87) PCT Pub. No.: WO2006/001363

PCT Pub. Date: Jan. 5, 2006

(65) Prior Publication Data

US 2008/0076873 A1    Mar. 27, 2008

(30) Foreign Application Priority Data

Jun. 28, 2004    (JP) .............................. 2004-189685

(51) Int. Cl.
*C08L 27/22* (2006.01)
(52) U.S. Cl. ...................................... 525/199; 524/520
(58) Field of Classification Search ................. 524/520; 525/199
See application file for complete search history.

(56) References Cited

U.S. PATENT DOCUMENTS

| 4,603,175 A | 7/1986 | Kawachi et al. |
| 6,737,479 B2 | 5/2004 | Faulkner |
| 2002/0099142 A1* | 7/2002 | Faulkner ..................... 525/199 |

FOREIGN PATENT DOCUMENTS

| JP | 61-252260 A | 11/1986 |
| JP | 2-117945 A | 5/1990 |
| JP | 6-293850 A | 10/1994 |
| JP | 10-139970 A | 5/1998 |
| JP | 2002-37965 A | 2/2002 |
| JP | 2005-146099 A | 6/2005 |

OTHER PUBLICATIONS

Satokawa, T., "Fusso Jushi Handbook", 1$^{st}$ edition, 1$^{st}$ print, The Nikkan Kogyo Shinbun, Ltd., Nov. 30, 1990; p. 553.

* cited by examiner

*Primary Examiner*—Kelechi C Egwim
(74) *Attorney, Agent, or Firm*—Sughrue Mion, PLLC

(57) ABSTRACT

The present invention provides a fluorine-containing elastomer composition comprising a fluorine-containing elastomer (A) and a fluorine-containing elastomer (B) having a fluorine amount of at least 67% by weigh and a lower molecular weight than the fluorine-containing elastomer (A), wherein the fluorine amount of the fluorine-containing elastomer (B) is larger than a fluorine amount of the fluorine-containing elastomer (A). The present invention also provides a molded article obtained by crosslinking the fluorine-containing elastomer composition.

9 Claims, No Drawings

FLUORINE CONTAINING ELASTOMER COMPOSITION AND MOLDED ARTICLE COMPRISING THE SAME

TECHNICAL FIELD

The present invention relates to a fluorine-containing elastomer composition comprising a fluorine-containing elastomer (A) and a fluorine-containing elastomer (B) having a fluorine amount of at least 67% by weigh and a lower molecular weight than the fluorine-containing elastomer (A), wherein the fluorine amount of the fluorine-containing elastomer (B) is larger than a fluorine amount of the fluorine-containing elastomer (A). The present invention also relates to a molded article obtained by crosslinking the fluorine-containing elastomer composition.

BACKGROUND ART

A fluorine-containing elastomer is widely used in various fields such as the automobile industry, the semiconductor industry, and the chemical industry as a sealing material used under severe environments since the fluorine-containing elastomer shows excellent chemical resistance, solvent resistance, and heat resistance.

For example in the automobile industry, a fluorine-containing elastomer is used as a sealing material, a hose material and the like in an engine and its peripheral equipments, AT equipments, and a fuel system and its peripheral equipments etc, however, along with environmental regulations in recent year, a regulation of SHED (Sealed Housing for Evaporative Determination) has been reinforced, and development of a fuel rubber material having low fuel permeability is particularly expected. The fuel rubber material is also required to have various properties such as processability, oil resistance and cold resistance other than low fuel permeability.

Further, an oxygen-containing compound is added to recent fuels in order to reduce $CO_2$ emission, however, the oxygen-containing compound acts for promoting fuel permeability of a fluorine containing rubber, thus, development of a material having low fuel permeability is desired for such fuels in which the oxygen-containing compound is added. As for such fuel rubber material, a fluorine-containing rubber excellent in properties such as heat resistance and oil resistance have drawn attention. However, in a fluorine-containing rubber in mainstream polyol cure, when a fluorine amount is increased for low fuel permeability, processability tends to be lowered, and it has been considered that satisfying these properties together is difficult.

As a fluorine-containing elastomer in which processability is improved, a fluorine-containing elastomer comprising a tetrafluoroethylene-propylene copolymer and a vinylidene fluoride-propylene hexafluoride copolymer having a number average molecular weight of at most 5,000 is disclosed in JP-A-61-206115. This fluorine-containing elastomer is improved in processability since a low molecular weight polymer is added, however, there is no particular description regarding a fluorine amount, and since a fluorine amount of any copolymer used in Examples is less than 67%, the fluorine-containing elastomer is not sufficient in respect of low fuel permeability.

JP-A-2-117945 also discloses a composition comprising a fluoroelastomer having a fluorine amount of 68 to 71% by weight and a intrinsic viscosity of 100 to 300 mL/g and a fluoroelastomer having a fluorine amount of 64 to 67% by weight and a intrinsic viscosity of 10 to 50 mL/g. This composition is improved in compression set, mechanical properties and processability, but since a fluorine amount of the low molecular weight fluoroelastomer is lower than a fluorine amount of the high molecular weight fluoroelastomer, the composition is not sufficient in respect of low fuel permeability.

As a general means to improve processability, a process of adding a general plasticizer such as polyethylene and dioctyl sebacate is mentioned. Although it is possible to lower viscosity of an elastomer composition by using a plasticizer, since fuel permeability is deteriorated, the process is not sufficient in respect of low fuel permeability.

As described above, a fluorine-containing elastomer composition improving both processability and fuel permeability has not existed.

DISCLOSURE OF INVENTION

The present invention provides a fluorine-containing elastomer composition comprising a fluorine-containing elastomer (A) and a fluorine-containing elastomer (B) having a fluorine amount of at least 67% by weigh and a lower molecular weight than the fluorine-containing elastomer (A), wherein the fluorine amount of the fluorine-containing elastomer (B) is larger than a fluorine amount of the fluorine-containing elastomer (A). The present invention also provides a molded article obtained by crosslinking the fluorine-containing elastomer composition.

Namely, the present invention relates to a fluorine-containing elastomer composition comprising a fluorine-containing elastomer (A) and a fluorine-containing elastomer (B) having a fluorine amount of at least 67% by weigh and a lower molecular weight than the fluorine-containing elastomer (A), wherein the fluorine amount of the fluorine-containing elastomer (B) is larger than a fluorine amount of the fluorine-containing elastomer (A).

It is preferable that the fluorine amount of the fluorine-containing elastomer (B) is at least 69% by weight.

It is preferable that the fluorine amount of the fluorine-containing elastomer (A) is at least 69% by weight to less than 71% by weight, the fluorine amount of the fluorine-containing elastomer (B) is at least 71% by weight to at most 76% by weight, and an amount of the fluorine-containing elastomer (B) is 0.1 to 90 parts by weight based on 100 parts by weight of the fluorine-containing elastomer (A).

It is preferable that the fluorine amount of the fluorine-containing elastomer (B) is at least 72% by weight.

It is preferable that a Mooney viscosity of the fluorine-containing elastomer (B) at 100° C. is at most 60.

It is preferable that a Mooney viscosity of the fluorine-containing elastomer composition at 121° C. is at most 90.

It is preferable that a Mooney viscosity of the fluorine-containing elastomer composition at 121° C. is at most 82, and a fuel permeation rate of a fuel comprising 45% by volume of toluene, 45% by volume of isooctane and 10% by volume of ethanol at 40° C. is at most 18 g·mm/day·m².

It is preferable that the fluorine-containing elastomer (A) is a vinylidene fluoride fluorine rubber It is preferable that the fluorine-containing elastomer composition further comprises a curing agent (C).

It is preferable that the fluorine-containing elastomer composition comprises a polyol curing agent as the curing agent (C).

The present invention further relates to a molded article and a fuel hose for an automobile, which are obtained by crosslinking the above-described fluorine-containing elastomer composition.

BEST MODE FOR CARRYING OUT THE INVENTION

The present invention relates to a fluorine-containing elastomer composition comprising a fluorine-containing elastomer (A) and a fluorine-containing elastomer (B) having a fluorine amount of at least 67% by weigh and a lower molecular weight than the fluorine-containing elastomer (A), wherein the fluorine amount of the fluorine-containing elastomer (B) is larger than a fluorine amount of the fluorine-containing elastomer (A).

The fluorine-containing elastomer (A) is not particularly limited, and examples are a fluorine rubber (a), a thermoplastic fluorine rubber (b), and a rubber composition comprising these fluorine rubbers, and the fluorine rubber (a) is preferably used.

As the fluorine rubber (a), nonperfluoro fluorine rubber (a-1) and perfluoro fluorine rubber (a-2) are included. In addition, a perfluoro fluorine rubber refers to those comprising perfluoro monomer units of at least 90% by mol based on the structural unit thereof.

As the nonperfluoro fluorine rubber (a-1), examples are a vinylidene fluoride (VdF) fluorine rubber, a tetrafluoroethylene (TFE)/propylene fluorine rubber, a tetrafluoroethylene (TFE)/propylene/vinylidene fluoride (VdF) fluorine rubber, an ethylene/hexafluoropropylene (HFP) fluorine rubber, an ethylene/hexafluoropropylene (HFP)/vinylidene fluoride (VdF) fluorine rubber, an ethylene/hexafluoropropylene (HFP)/tetrafluoroethylene (TFE) fluorine rubber, a fluorosilicone fluorine rubber, or a fluorophosphazene fluorine rubber, and these can be used alone or in arbitrary combination within a range not damaging the effect of the present invention, but it is preferable to use a vinylidene fluoride (VdF) fluorine rubber and a tetrafluoroethylene (TFE)/propylene fluorine rubber.

As the vinylidene fluoride (VdF) fluorine rubber, a fluorine rubber represented by the following general formula (1) is preferable:

$$-(M^1)-(M^2)-(N^1)- \tag{1}$$

(wherein the structural unit $M^1$ is a structural unit derived from vinylidene fluoride ($m^1$), the structural unit $M^2$ is a structural unit derived from a fluorine-containing ethylenic monomer ($m^2$), and the structural unit $N^1$ is a repeating unit derived from a monomer ($n^1$) copolymerizable with the monomer ($m^1$) and the monomer ($m^2$)).

Among vinylidene fluoride (VdF) fluorine rubbers represented by the general formula (1), a fluorine rubber containing 45 to 85% by mol of the structural unit $M^1$ and 55 to 15% by mol of the structural unit $M^2$ is preferable, and a fluorine rubber containing 50 to 80% by mol of the structural unit $M^1$ and 50 to 20% by mol of the structural unit $M^2$ is more preferable. The structural unit $N^1$ is preferably 0 to 10% by mol based on the total amount of the structural unit $M^1$ and the structural unit $M^2$.

As the fluorine-containing ethylenic monomer ($m^2$), examples are fluorine containing monomers such as tetrafluoroethyene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ether) (PAVE), and vinyl fluoride, and at least one kind thereof is adopted. Among these, tetrafluoroethylene, hexafluoropropylene and perfluoro(alkyl vinyl ether) are preferable.

As the monomer ($n^1$), any monomer may be used as long as the monomer is copolymerizable with the monomer ($m^1$) and the monomer ($m^2$), and examples are ethylene, propylene, and an alkyl vinyl ether.

As such vinylidene fluoride (VdF) fluorine rubber, specifically, preferable examples are a VdF-HFP rubber, a VdF-HFP-TFE rubber, a VdF-CTFE rubber, a VdF-CTFE-TFE rubber, a VdF/PAVE rubber, a VdF/TFE/PAVE rubber, a VdF/HFP/PAVE rubber, and a VdF/HFP/TFE/PAVE rubber.

As a tetrafluoroethylene (TFE)/propylene fluorine rubber, a fluorine rubber represented by the following general formula (2) is preferable:

$$-(M^3)-(M^4)-(N^2)- \tag{2}$$

(wherein the structural unit $M^3$ is a structural unit derived from tetrafluoroethylene ($m^3$), the structural unit $M^4$ is a structural unit derived from propylene ($m^4$), and the structural unit $N^2$ is a repeating unit derived from the monomer ($n^2$) copolymerizable with the monomer ($m^3$) and the monomer ($m^4$)).

Among tetrafluoroethylene (TFE)/propylene fluorine rubbers represented by the general formula (2), a fluorine rubber containing 40 to 70% by mol of the structural unit $M^3$ and 60 to 30% by mol of the structural unit $M^4$ is preferable, and a fluorine rubber containing 50 to 60% by mol of the structural unit $M^3$ and 50 to 40% by mol of the structural unit $M^4$ is more preferable. The structural unit $N^2$ is preferably 0 to 40% by mol based on the total amount of the structural unit $M^3$ and the structural unit $M^4$.

As the monomer ($n^2$), any monomer may be used as long as the monomer is copolymerizable with the monomer ($m^3$) and the monomer ($m^4$), but it is preferable that the monomer provides a cure site.

As such monomer giving a cure site, examples are iodine-containing monomers such as perfluoro(6,6-dihydro-6-iodo-3-oxa-1-hexene) and perfluoro(5-iodo-3-oxa-1-pentene) described in JP-B-5-63482 and JP-A-7-316234, and a bromine-containing monomer described in JP-A-4-505341, and a cyano group-containing monomer, a carboxyl group-containing monomer and an alkoxycarbonyl group-containing monomer described in JP-A-4-505345 and JP-A-5-500070.

As the perfluoro fluorine rubber (a-2), a fluorine rubber represented by the following general formula (3) is preferable.

$$-(M^5)-(M^6)-(N^3)- \tag{3}$$

(wherein the structural unit $M^5$ is a structural unit derived from tetrafluoroethylene ($m^5$), the structural unit $M^6$ is a structural unit derived from a perfluoro(alkyl vinyl ether) ($m^6$), and the structural unit $N^3$ is a repeating unit derived from the monomer ($n^3$) copolymerizable with the monomer ($m^5$) and the monomer ($m^6$)).

Among the perfluoro fluorine rubber (a-2) represented by the general formula (3), a fluorine rubber containing 50 to 90% by mol of the structural unit $M^5$ and 10 to 50% by mol of the structural unit $M^6$ is preferable, a fluorine rubber containing 50 to 80% by mol of the structural unit $M^5$ and 20 to 50% by mol of the structural unit $M^6$ is more preferable, and a fluorine rubber containing 55 to 70% by mol of the structural unit $M^5$ and 30 to 45% by mol of the structural unit $M^6$ is further more preferable. The structural unit $N^3$ is preferably 0 to 5% by mol based on the total amount of the structural unit $M^5$ and the structural unit $M^6$, and more preferably 0 to 2% by mol. If the composition is out of these ranges, properties as a rubber elastic body are lost, and the properties tends to be similar to those of a resin.

As the perfluoro(alkyl vinyl ether) (m⁶), examples are a perfluoro(methyl vinyl ether) and a perfluoro(propyl vinyl ether), and these can used alone or in arbitrary combination.

As the monomer (n³), any monomer may be used as long as the monomer is copolymerizable with the monomer (m⁵) and the monomer (m⁶), but it is preferable that the monomer provides a cure site.

As such monomer giving a cure site, examples are vinylidene fluoride, an iodine- or bromine-containing monomer represented by the general formula (4):

$$CY^1_2=CY^1-R_f^1CHR^1X^1 \qquad (4)$$

(wherein $Y^1$ is a hydrogen atom, a fluorine atom or $CH_3$, $R_f^1$ is a fluoroalkylene group, a perfluoroalkylene group, a fluoropolyoxyalkylene group or a perfluoropolyoxyalkylene group, $R^1$ is a hydrogen atom or $CH_3$, and $X^1$ is an iodine atom or a bromine atom), and a monomer represented by the general formula (5):

$$CF_2=CFO(CF_2CF(CF_3)O)_m(CF_2)_n-X^2 \qquad (5)$$

(wherein m is an integer of 0 to 5, n is an integer of 1 to 3, $X^2$ is a cyano group, a carboxyl group, an alkoxycarbonyl group or a bromine atom), and these can be used alone or in arbitrary combination.

These iodine atom, bromine atom, cyano group, carboxyl group, and alkoxycarbonyl group can function as a curing point.

Specific examples of the perfluoro fluorine rubber (a-2) are fluorine rubbers described in a pamphlet of WO97/24381, JP-B-61-57324, JP-B-4-81608, and JP-B-5-13961.

Further, the fluorine rubber (a) is preferably a fluorine rubber having a number average molecular weight of 1,000 to 500,000.

The above-explained nonperfluoro fluorine rubber (a-1) and perfluoro fluorine rubber (a-2) can be prepared in usual processes, but an example of a preferable preparation process is known iodine transfer polymerization as a preparation process of a fluorine rubber. For example, a process of carrying out emulsion polymerization in the presence of a radical initiator while stirring the perhaloolefin and, if necessary, a monomer giving a cure site with pressurization in the presence of an iodine compound, preferably, a diiodine compound in an aqueous medium under substantially no oxygen is exemplified. A representative example of the iodine compound to be used is a compound represented by the general formula (6):

$$R^2I_xBr_y \qquad (6)$$

(wherein x and y are respectively integers of 0 to 2, and satisfy $1 \leq x+y \leq 2$ $R^2$ is a saturated or unsaturated fluorohydrocarbon group or chlorofluorohydrocarbon group having 1 to 16 carbon atoms, or a hydrocarbon group having 1 to 3 carbon atoms, which may contain an oxygen atom). An iodine atom or a bromine atom is introduced into the terminal of a fluorine-containing elastomer obtained by using such iodine compound.

As a compound represented by the general formula (6), examples are 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodo-perfluorohexane, 1,8-diiodo-perfluorooctane, 1,12-diiodoperfluorododecane, 1,16-diiodoperfluorohexadecane, diiodomethane, 1,2-diiodoethane, 1,3-diiodo-n-propane, 2-iodoperfluoropropane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, and monoiodo-monobromo substitute, diiodo substitute, and (2-iodoethyl) or (2-bromoethyl) substitute of benzene. These compounds may be used alone, or combined each other to be used.

Among these, 1,4-diiodoperfluorobutane, diiodomethane, and 2-iodoperfluoropropane are preferable from the viewpoints of polymerization reactivity, curing reactivity, and availability.

Radical polymerization initiators used in the present invention may be the same as conventionally used in polymerization of fluorine-containing elastomers. These initiators include organic or inorganic peroxides and azo compounds. As typical initiators, examples are persulfates, carbonate peroxides and peroxide esters, and as a favorable initiator, an example is ammonium persulfate (APS). APS may be used alone, or can be used in combination with reducing agents such as sulfites and sulfite salts.

As emulsifiers used in emulsion polymerization, those in a broad range can be used, but salts of carboxylic acid having a fluorocarbon chain or a fluoropolyether chain are desirable from the viewpoint of suppressing a chain transfer reaction to an emulsifier molecule occurred during polymerization. An amount in use of the emulsifier is preferably 0.05 to 2% by weight based on added water, and particularly preferably 0.2 to 1.5% by weight.

Since a monomer mixed gas used in the present invention has explosiveness as described in Advances in Chemistry Series by G. H. Kalb et al., 129, 13 (1973), it is necessary that a polymerization device be designed not to generate those to be ignition sources such as spark.

A polymerization pressure can be changed in a broad range. The range is generally 0.5 to 7 MPa. Since the higher the polymerization pressure is, the larger a polymerization speed is, it is preferable that the polymerization pressure is at least 0.8 MPa from the viewpoint of improvement in productivity.

A thermoplastic fluorine rubber (b) is a rubber comprising an elastomeric fluorine-containing polymer chain segment and a non-elastomeric fluorine-containing polymer chain segment, and examples are a fluorine-containing multi-segmented polymer (b-1) in which at least 90% by mol of respective structural units of the elastomeric fluorine-containing polymer chain segment and the non-elastomeric fluorine-containing polymer chain segment is perhaloolefin, a fluorine-containing multi-segmented polymer (b-2) in which at least 90% by mol of a structural unit of the elastomeric fluorine-containing polymer chain segment is perhaloolefin and the non-elastomeric fluorine-containing polymer chain segment contains less than 90% by mol of perhaloolefin as a structural unit, and a fluorine-containing multi-segmented polymer (b-3) in which the elastomeric fluorine-containing polymer chain segment contains less than 90% by mol of perhaloolefin as a structural unit, and at least 90% by mol of a structural unit of the non-elastomeric fluorine-containing polymer chain segment is perhaloolefin, or the non-elastomeric fluorine-containing polymer chain segment contains less than 90% by mol of perhaloolefin as the structural unit.

The fluorine-containing multi-segmented polymer (b-1) which is a thermoplastic fluorine rubber (b) is explained in the following.

First, an elastomeric fluorine-containing polymer chain segment is explained. The elastomeric fluorine-containing polymer chain segment imparts flexibility to a polymer, and has a glass transition temperature of at most 25° C., and preferably at most 0° C. As perhaloolefin composing at least 90% by mol of the structural unit thereof, examples are tetrafluoroethylene, chlorotrifluoroethylene, hexafluoropropylene, and a perfluoro vinyl ether represented by the genera formula (7):

$$CF_2=CFO(CF_2CFY^2O)_p-(CF_2CF_2CF_2O)_q-R_f^2 \quad (7)$$

(wherein $Y^2$ is a fluorine atom or $CF_3$, $R_f^2$ is a perfluoroalkyl group having 1 to 5 carbon atoms, p is an integer of 0 to 5, and q is an integer of 0 to 5).

As a structural unit composing the elastomeric fluorine-containing polymer chain segment other than perhaloolefin, examples are fluorine-containing monomers such as vinylidene fluoride, trifluoroethylene, trifluoropropylene, tetrafluoropropylene, pentafluoropropylene, trifluorobutene, tetrafluoroisobutene and vinyl fluoride, and non-fluorine-containing monomers such as ethylene, propylene and an alkyl vinyl ether.

A preferable example of the elastomeric fluorine-containing polymer chain segment is an elastomeric polymer chain obtained by polymerizing tetrafluoroethylene/perfluoro(alkyl vinyl ether)/a monomer imparting an cure site. A composition of tetrafluoroethylene/perfluoro(alkyl vinyl ether) is 50 to 85/50 to 15% by mol, and a composition of the monomer imparting a cure site is preferably 0 to 5% by mol based on the total amount of tetrafluoroethylene/perfluoro(alkyl vinyl ether).

As the monomer imparting the cure site, examples are monomers represented by the general formulas (4) and (5), and these can be used alone, or arbitrarily combined to be used.

A non-elastomeric fluorine-containing polymer chain segment is explained in the following. As perhaloolefin composing at least 90% by mol of the structural unit of the non-elastomeric fluorine-containing polymer chain segment, examples are tetrafluoroethylene, chlorotrifluoroethylene, perfluoro(alkyl vinyl ether), hexafluoropropylene, a compound represented by the general formula (8):

$$CF_2=CF(CF_2)_rX^3 \quad (8)$$

(wherein r is an integer of 1 to 10, and $X^3$ is a fluorine atom and a chlorine atom), and perfluoro-2-butene.

As a structural unit composing the non-elastomeric fluorine-containing polymer chain segment other than perhaloolefin, examples are the same as the above-described examples of the structural unit composing the elastomeric fluorine-containing polymer chain segment other than perhaloolefin.

As a preferable example of the non-elastomeric fluorine-containing polymer chain segment is a non-elastomeric polymer chain obtained by polymerizing 85 to 100% by mol of tetrafluoroethylene and 0 to 15% by mol of a compound represented by the general formula (9):

$$CF_2=CF-R_f^3 \quad (9)$$

(wherein $R_f^3$ is $R_f^4$ or $-OR_f^4$, and $R_f^4$ is a perfluoroalkyl group having 1 to 5 carbon atoms).

The fluorine-containing multi-segmented polymer (b-1) preferably comprises 50 to 95% by weight of an elastomeric fluorine-containing polymer chain segment and 5 to 50% by weight of a non-elastomeric fluorine-containing polymer chain segment.

The fluorine-containing multi-segmented polymer (b-2) is explained in the following.

An elastomeric fluorine-containing polymer chain segment in this case may be the same as those explained for the above described fluorine-containing multi-segmented polymer (b-1).

As a structural unit of the non-elastomeric fluorine-containing polymer chain segment, examples are partially-fluorinated olefin such as vinylidene fluoride, vinyl fluoride, trifluoroethylene, a compound represented by the general formula (10):

$$CH_2=CX^4-(CF_2)_s-X^4 \quad (10)$$

and $CH_2=C(CF_3)_s$.

Further, monomers copolymerizable with these monomers such as ethylene, propylene, vinyl chloride, vinyl ether, vinyl carboxylate, and acrylic acid can be used as a copolymer component.

The fluorine-containing multi-segmented polymer (b-2) preferably comprises 50 to 95% by weight of an elastomeric fluorine-containing polymer chain segment and 5 to 50% by weight of a non-elastomeric fluorine-containing polymer chain segment.

The fluorine-containing multi-segmented polymer (b-3) is explained in the following.

An elastomeric fluorine-containing polymer chain segment in the fluorine-containing multi-segmented polymer (b-3) is a polymer chain having a glass transition temperature of at most 25° C., preferably at most 0° C.

Further, the elastomeric fluorine-containing polymer chain segment contains less than 90% by mol of perhaloolefin as a structural unit. As a structural unit other than perhaloolefin in this case, examples are the same as the structural units of the above-described fluorine-containing multi-segmented polymer (b-1) other than perhaloolefin.

A non-elastomeric fluorine-containing polymer chain segment in the fluorine-containing multi-segmented polymer (b-3) may be the same as the above-described fluorine-containing multi-segmented polymer (b-1) or (b-2). Particularly, it may be the same as a non-elastomeric fluorine-containing polymer chain segment in (b-2).

Further, the fluorine-containing multi-segmented polymer (b-3) preferably comprises 40 to 95% by weight of an elastomeric fluorine-containing polymer chain segment and 5 to 60% by weight of a non-elastomeric fluorine-containing polymer chain segment.

In addition, a crystalline melting point of a non-elastomeric fluorine-containing polymer chain segment of the obtained thermoplastic fluorine rubber (b) is preferably at least 150° C., and more preferably 200 to 360° C. from the viewpoint of heat resistance.

As for the thermoplastic fluorine rubber (b), various known processes can be adopted, in which an elastomeric segment and a non-elastomeric segment are connected in a form such as block or graft so as to be a fluorine-containing multi-segmented polymer, and in particular, a preparation process of a block-type fluorine-containing multi-segmented polymer shown in JP-B-58-4728, and a preparation process of a graft-type fluorine-containing multi-segmented polymer shown in JP-A-62-34324 are preferably adopted.

In particular, it is preferable that the thermoplastic fluorine rubber (b) is the block-type fluorine-containing multi-segmented polymer synthesized by so-called iodine transfer polymerization, which is described in JP-B-58-4728 and in Kobunshi Ronbunshu (Vol. 49, No. 10, 1992) from the viewpoints that a segmentation ratio (block ratio) is high, and a homogeneous and orderly segmented polymer can be obtained.

When an elastomeric fluorine-containing polymer chain segment of the thermoplastic fluorine rubber (b) is prepared by the above-described iodine transfer polymerization, a number average molecular weight thereof is preferably 5,000 to 750,000, and more preferably 20,000 to 400,000 from the viewpoints of imparting flexibility, elasticity, and mechanical properties to the obtained whole fluorine-containing multi-segmented polymer.

A terminal part of the elastomeric segment obtained in this manner is a perhalo type, and has an iodine atom which is to be a initiation point of block polymerization of a non-elastomeric segment.

Subsequently, the block polymerization of a non-elastomeric fluorine-containing polymer chain segment to an elastomeric fluorine-containing polymer chain segment can be carried out by converting a monomer to one for the non-elastomeric fluorine-containing polymer chain segment followed by emulsion polymerization of the elastomeric fluorine-containing polymer chain segment.

A number average molecular weight of the obtained non-elastomeric segment is preferably 1,000 to 1,200,000, and more preferably 3,000 to 600,000.

The thermoplastic fluoropolymer (b) obtained in this manner mainly comprises a polymer molecule in which non-elastomeric fluorine-containing polymer chain segments are bonded to the both sides of an elastomeric fluorine-containing polymer chain segment and a polymer molecule in which a non-elastomeric fluorine-containing polymer chain segment is bonded to one side of an elastomeric fluorine-containing polymer chain segment, and a polymer molecule comprising only an elastomeric segment in which a non-elastomeric segment is not bonded is at most 20% by weight, and preferably at most 10% by weight based on the total amount of the segment and the polymer molecule in the fluorine-containing multi-segmented polymer.

In the present invention, a composition comprising the above-described fluorine rubber (a) and thermoplastic fluorine rubber (b) can be also used.

The first fluorine rubber composition comprising the non-perfluoro fluorine rubber (a-1) and the fluorine-containing multi-segmented polymer (b-1) can be obtained by mixing the non-perfluoro fluorine rubber (a-1) and the fluorine-containing multi-segmented polymer (b-1) obtained as the above description in a state of dispersion or mixing at an arbitrary ratio by means of dry blending such as in an open roll.

Further, as an object to improve mold releasing property at molding, additives such as an internal mold release agent can be suitably compounded in a range not damaging the effect of the present invention. According to kinds of curing processes described later, a curing agent can be compounded.

The second fluorine rubber composition comprising the non-perfluoro fluorine rubber (a-1) and the fluorine-containing multi-segmented polymer (b-2), the third fluorine rubber composition comprising the perfluoro fluorine rubber (a-2) and the fluorine-containing multi-segmented polymer (b-3), the fourth fluorine rubber composition comprising the perfluoro fluorine rubber (a-2) and the fluorine-containing multi-segmented polymer (b-2), and the fifth fluorine rubber composition comprising the perfluoro fluorine rubber (a-2) and a fluorine-containing multi-segmented polymer (b-1) can be obtained by the same manner as first fluorine rubber composition.

In this case, the above-described additives can be compounded in a range not damaging the effects of the present invention, and according to kinds of curing processes described later, a curing agent can be compounded.

Since a perfluoro fluorine rubber (a-2) and the above-described fluorine-containing multi-segmented polymer (b-1) substantially can not be radiation-cured, since both of them are inferior in efficiency of radiation cure, and when the fifth fluorine rubber composition is cured, it has to be cured by introducing a cure site capable of peroxide-curing etc into at least one rubber.

As a fluorine rubber in which a cure site is introduced, a fluorine rubber in which an iodine atom or a bromine atom is introduced in a terminal or a side chain of a polymer is favorable. This fluorine rubber can be prepared by the above-described iodine transfer polymerization.

An amount to be added of the compound represented by the general formula (6) may be 0.0001 to 5% by weight, and further, preferably 0.01 to 1% by weight based on the whole amount of the fluorine-containing elastomer to be obtained.

In addition, as the fluorine-containing elastomer, a fluorine-containing silicone elastomer can be also used, and an example is a fluorosilicone rubber.

As a fluorine-containing elastomer (A), among the above-described fluorine rubber (a), thermoplastic fluorine rubber (b) and a rubber composition comprising these fluorine rubbers, from the viewpoint of balance between physical properties of the rubber composition and economical efficiency, a vinylidene fluoride rubber is preferable, a VdF/HFP/TFE rubber is more preferable, and VdF/HFP/TFE=15 to 98/1 to 45/1 to 55 (% by mol) is further more preferable, and VdF/HFP/TFE=45 to 85/14 to 35/1 to 40 (% by mol) is particularly preferable.

A fluorine amount of the fluorine-containing elastomer (A) may be less than a fluorine amount of the fluorine-containing elastomer (B), and although the fluorine amount is not particularly limited, it is preferably 50 to 75% by weight, more preferably 65 to 72% by weight, and further preferably at least 69% by weight and less than 71% by weight. When the fluorine amount is less than 50% by weight, it tends that improvement effects of fuel permeability is not sufficiently exerted, and when it is more than 75% by weight, it tends that cold resistance and vulcanizing property are deteriorated.

The fluorine-containing elastomer (B) is explained in the following.

The fluorine-containing elastomer (B) is not particularly limited, as long as it has a lower molecular weight than the fluorine-containing elastomer (A), a fluorine amount is at least 67% by weight, and further the fluorine amount is more than a fluorine amount of the fluorine-containing elastomer (A), but it is preferably 1 to 10% by weight larger, and more preferably 1 to 7% by weight larger than the fluorine amount of the fluorine-containing elastomer (A).

The fluorine amount of the fluorine-containing elastomer (B) is at least 67% by weight, preferably at least 69% by weight, more preferably at least 71% by weight, and further preferably at least 72% by weight. When the fluorine amount is less than 67% by weight, it tends that improvement effects of fuel permeability is not sufficiently exerted. Further, an upper limit of the fluorine amount is preferably at most 76% by weight, and more preferably at most 73% by weight from the viewpoint of having elastomeric property.

As the fluorine-containing elastomer (B), examples are the same as those for the above-described fluorine-containing elastomer (A), but it is preferable to contain a larger amount of perfluoroolefin such as tetrafluoroethylene and hexafluoropropylene since a fluorine amount is larger than that of the fluorine-containing elastomer (A).

As the fluorine-containing elastomer (B), among the above-described fluorine rubber (a), thermoplastic fluorine rubber (b) and a rubber composition comprising these fluorine rubbers, a vinylidene fluorine rubber is preferable, a VdF/HFP/TFE rubber is more preferable, and VdF/HFP/TFE=15 to 98/1 to 45/1 to 55 (% by mol) is further more preferable, and VdF/HFP/TFE=20 to 75/10 to 40/15 to 50 (% by mol) is particularly preferable.

The fluorine-containing elastomer (B) has a lower molecular weight than the fluorine-containing elastomer (A), and a number average molecular weight is preferably 1,000 to 1,000,000, and more preferably 3,000 to 200,000. When the number average molecular weight is less than 1,000, physical properties of the composition tend to be lowered, and when it is more than 1,000,000, processability tends to be deteriorated.

Further, the fluorine-containing elastomer (B) preferably has a Mooney viscosity at 100° C. of at most 60, more preferably at most 55, further more preferably at most 53, and particularly preferably at most 50. The fluorine-containing elastomer (B) preferably has a Mooney viscosity at 100° C. of at least 1. When the Mooney viscosity is less than 1, physical properties of the composition tend to be lowered, and when it is more than 60, processability tends to be deteriorated.

An amount of the fluorine-containing elastomer (B) is preferably 0.1 to 90 parts by weight, and more preferably 1 to 50 parts by weight based on 100 parts by weight of the fluorine-containing elastomer (A). When the amount of the fluorine-containing elastomer (B) is less than 0.1 part by weight, it tends that improvement effects of processability and fuel permeability are not sufficiently exerted, and when it is more than 90 parts by weight, it tends that cold resistance and vulcanizing property are deteriorated.

In the present invention, an elastomeric component (raw gum) comprising the fluorine-containing elastomer (A) and the fluorine-containing elastomer (B) preferably has a Mooney viscosity at 100° C. of at most 80, more preferably at most 70, and further more preferably at most 60. Although a lower limit is not particularly limited, it is preferably at least 10. When the Mooney viscosity is less than 10, physical properties of the composition tends to be lowered, and when it is more than 80, processability tends to be deteriorated.

A glass transition temperature of the elastomer component (raw gum) comprising the fluorine-containing elastomer (A) and the fluorine-containing elastomer (B) is preferably at most 10° C., and more preferably at most 0° C.

Further, in the fluorine-containing elastomer composition of the present invention, a curing agent (C) is preferably contained.

The curing agent (C) may be suitably selected by adopted curing system. Examples of curing system are polyamine cure, polyol cure, imidazole cure, triazine cure, oxazole cure and thiazole cure, and curing system in a combination of polyol cure and peroxide cure can be also adopted. Among these, from the viewpoints of the most prominently exerting addition effects of a low molecular weight fluorine-containing elastomer (B) and being capable of having both low fuel permeability and processability, polyamine cure, polyol cure, and combination cure of polyol cure and peroxide cure are preferable, and polyol cure and combination cure of polyol cure and peroxide cure are more preferable.

As a curing agent, examples in the polyol cure are polyhydroxy compounds such as bisphenol AF, hydroquinone, bisphenol A, diaminobisphenol AF, examples in peroxide cure are organic peroxides such as α,α'-bis(t-butylperoxy)diisopropylbenzene, 2,5-dimethyl-2,5-di (t-butylperoxy)hexane, and dicumyl peroxide, and examples in polyamine cure are polyamine compounds such as hexamethylenediamine carbamate, and N,N'-dicinnamylidene-1,6-hexamethylenediamine.

An mount to be added of a curing agent is preferably 0.05 to 10 parts by weight, and more preferably 1 to 5 parts by weight based on 100 parts by weight of the total amount of the fluorine-containing elastomer (A) and the fluorine-containing elastomer (B). When the curing agent is less than 0.05 part by weight, performance of a fluorine-containing molded article tends to be damaged since a crosslinking degree is in short, and when it is more than 10 parts by weight, besides that curing time tends to be long since a crosslinking density becomes too high, it is also not economically preferable.

As a curing aid in the polyol cure, organic bases generally used for crosslinking an elastomer such as various quaternary ammonium salts, quaternary phosphonium salts, cyclic amines, and monofunctional amine compounds can be used. Specific examples are quaternary ammonium salts such as tetrabutylammonium bromide, tetrabutylammonium chloride, benzyltributylammonium chloride, benzyltriethylammonium chloride, tetrabutylammonium hydrogensulfate and tetrabutylammonium hydroxide; quaternary phosphonium salts such as benzyltriphenylphosphonium chloride, tributylallylphosphonium chloride, tributyl-2-methoxypropylphosphonium chloride and benzylphenyl (dimethylamino)phosphonium chloride; monofunctional amines such as benzylmethylamine and benzylethanolamine; and cyclic amines such as 1,8-diazabicyclo[5.4.0]-undec-7-ene and 8-benzyl-1,8-diazabicyclo[5.4.0]-7-undecenium chloride.

As a curing aid for the peroxide cure, examples are triallyl cyanurate, triallyl isocyanurate (TAIC), tris(diallylamine-s-triazine), triallyl phosphite, N,N-diallyl acrylamide, hexaallyl phospholamide, N,N,N',N'-tetraallyl tetraphtalamide, N,N,N',N'-tetraallyl malonamide, trivinyl isocyanurate, 2,4,6-trivinylmethyl trisiloxane, and tri(5-norbornene-2-methylene)cyanurate. Among them, triallyl isocyanurate (TAIC) is preferable from the viewpoints of its curing property and physical properties of cured articles.

An amount to be added of a crosslinking aid is 0.1 to 10 parts by weight, and preferably 0.5 to 5 parts by weight based on 100 parts by weight of the fluorine-containing elastomer (A) and the fluorine-containing elastomer (B). When the crosslinking aid is less than 0.1 part by weight, it tends that a curing time becomes long enough not to endure for practical uses, and when it is more than 10 parts by weight, in addition that a curing time becomes too fast, compression set of a molded article tends to be lowered.

In the fluorine-containing elastomer composition of the present invention, additives generally compounded in a composition comprising a fluorine-containing elastomer according to necessity, for example, a filler, a processing aid, a plasticizer, a colorant, an antioxidant, an antiaging agent, an ozone degrading agent, and an ultraviolet ray absorber can be compounded, one kind or more of a curing agent or a curing aid for a general use different from the above-described additives may be compounded, and the composition can be prepared by mixing each component using a general elastomer processing machine such as an open roll, a banbury mixer and a kneader. Other than these, the composition can be prepared by a process of using a closed-mixer and a process of co-coagulation from emulsion mixing.

A Mooney viscosity at 121° C. of a fluorine-containing elastomer obtained in this manner is preferably at most 90, and more preferably at most 82, and further more preferably at most 77. Further, a lower limit is not particularly limited, but it is preferably at least 10. When the Mooney viscosity is less than 10, physical properties of the composition tends to be lowered, and when it is more than 90, processability tends to be deteriorated.

A fuel permeation rate of fuel comprising CE10 (toluene/isooctane/ethanol=45/45/10 (% by volume)) at 40° C. of the fluorine-containing elastomer composition obtained in this manner is preferably at most 18 g·mm/day·m$^2$, and more preferably at most 15 g·mm/day·m$^2$. A lower limit of the fuel permeation rate is not particularly limited, but the lower the more favorable, when the fuel permeation rate is more than 18 g·mm/day·M$^2$, since fuel permeability resistance is low, it is necessary to thicken a thickness of a molded article in order to suppress a fuel permeability amount.

Further, the obtained fluorine-containing elastomer composition is cured and molded in accordance with general processes. Namely, the fluorine-containing elastomer composition is molded by processes such as compression molding, injection molding, extrusion molding, calender molding, or dip molding and coating by dissolving into a solvent.

Curing conditions are different depending on a molding process and a shape of a molded article, but these are largely within ranges of a temperature from 100 to 200° C., a time from several seconds to 180 minutes, and a pressure from 2 to 15 MPa. It is also possible to be cured under steam. In addition, post cure can be carried out in order to stabilize physical properties of a cured article. The post cure are carried out under the conditions at 150 to 300° C. and for about 30 minutes to about 30 hours.

The molded article of the present invention can be favorably used in fields shown in the following.

In the related fields of semiconductor such as an equipment for manufacturing a semiconductor, an equipment for manufacturing liquid crystal panel, an equipment for manufacturing plasma panel, plasma address liquid crystal panels, field emission display panels and solar cell boards, examples are O(square)-rings, packing, sealing materials, tubes, rolls, coating, lining, gaskets, diaphragms, hoses. These can be used in CVD equipment, dry etching machine, wet etching machine, equipment for oxidation and diffusion, sputtering equipment, ashing equipment, cleaning machine, ion implantation equipment, exhausting equipment, chemical liquid piping and gas piping. In specific terms, they can be used as O-rings and sealing materials for gate valves, as O-rings and sealing materials for quartz windows, as O-rings and sealing materials for chambers, as O-rings and sealing materials for gates, as O-rings and sealing materials for bell jars, as O-ring and sealing materials for couplings, as O-rings, sealing materials and diaphragms for pumps, as O-ring and sealing materials for gas controllers for semiconductors, as O-rings and sealing materials for resist developing and releasing solutions, as hoses and tubes for wafer cleaning solution, as rolls for transferring wafer, as lining and coating of tanks for resist developing solution and releasing solution, as lining and coating of tanks for wafer cleaning solution, and as lining and coating of tanks for wet etching. Further, they are used as sealants and sealing agents, as covering materials of quartz in optical fibers, as potting, coating, and adhesive seals for electronic components and circuit board that have the purposes of electrical insulation, vibration isolating, water-proofing, and moisture-proofing, as gaskets for magnetic storages, as modifying agents of sealants such as epoxy, as sealants for clean rooms and clean equipment, and the like.

In the Vehicle field, gaskets, shaft seals, valve stem seals, sealing materials and hoses can be used in engines and their auxiliary equipment, hoses and sealing materials can be used in AT equipment, O(square)-rings, tubes, packing, valve core materials, hoses, sealing materials, and diaphragms can be used in fuel line and auxiliary equipment. In specific terms, the sealing materials of the present invention can be used as engine head gaskets, metal gaskets, oil pan gaskets, crank shaft seals, cam shaft seals, valve stem seals, manifold packing, oil hoses, seals for oxygen sensors, ATF hoses, injector O-rings, injector packing, fuel pump O-rings, diaphragms, fuel hoses, crankshaft seals, gearbox seals, power piston packing, seals of cylinder liners, seals in valve stems, seals in front pumps in automatic transmissions, rear axle pinion seals, gaskets of universal joints, pinion seals in speedometers, piston cups of footbrakes, O-rings of torque transmissions, oil seals, seals in exhaust gas afterburners, bearing seals, EGR tubes, twin curb tubes, diaphragms for sensors in carburetors, rubber vibration isolator (such as an engine mounts, an exhaust part), hoses for afterburners, oxygen sensor bushes, and the like. The present invention is particularly preferable for a fuel hose required to have low fuel permeability.

In the aircraft field, the rocket field and the ship field, examples are diaphragms, O(square)-rings, valves, tubes, packing, hoses, sealing materials and can be used in fuel system. In specific terms, in the aircraft field, the sealing materials of the present invention are used in jet engine valve stem seals, hoses, gaskets and O-rings for fuel supply, rotating shaft seals, gaskets of hydraulic equipment, fire wall seals and the like, and in the marine vessel field, they are used in seals in the sterns of propeller shafts of screws, valve stem seals for intake air and exhaust air in diesel engines, valve seals of butterfly valves, shaft seals of butterfly valves and the like.

In the field of chemical products such as plants, examples are lining, valves, packing, rolls, hoses, diaphragms, O(square)-rings, tubes, sealing materials, chemical resistant coating, and they can be used in the production line of chemical products such as pharmaceuticals, agricultural chemicals, coating, and resins. Specifically, they can be used as pump for chemical products, seals for flowmeters and piping, seals for heat exchanger, packing for glass cooling device for manufacturing sulfuric acid, seals of device for scattering agricultural chemicals and agricultural chemicals transferring pump, seals for gas piping, seals for metal plating liquid, packing for high temperature vacuum drying oven, roller seals for belts in paper manufacturing, seals for fuel cells, joint seals for air channels, rolls for trichlene resistance (for dyeing fibers), acid-resistant hoses (for concentrated sulfuric acid), packing for bonding parts of tubes in gas chromatography and pH meters, hoses for transferring chloric gas, drain hoses of rain water in benzene and toluene storage tank, as seals, tubes, diaphragms and parts of valves for analytical instruments and equipment of physics and chemistry, and the like.

In the field of medicals such as pharmaceuticals, the sealing materials can be used as plugs for medicine containers and the like.

In the photograph field such as developing machine, the printing field such as printing machines and the coating field such as coating facilities are rolls, and they can be used for film processors and X-ray film developing machines, printing rolls, and coating rolls, respectively. In specific terms, they can be used as developing rolls in film processors and X-ray film processors, as gravure rolls and guide rolls of printing rolls, as gravure rolls of painting rolls in magnetic tape production and coating lines, as guide rolls in magnetic tape production and coating lines, various coating rolls, and the like. Further, the sealing materials can be used as seals for dry copying machines, as printing rolls, scrapers, tubes and valve parts in printing equipment, as coating rolls, scrapers, tubes and valve parts in coating and painting equipment, as ink tubes, rolls and belts in printers, as belts and rolls in dry copying machines, as rolls and belts in printing machines, and the like.

And tubes can be used in the filed of analyzer and physical and chemical appliances.

Examples of the field of food plant equipment are lining, valves, packing, rolls, hoses, diaphragms, O(square)-rings, tubes, sealing materials, belts, which can be used in the food processing line. Specifically, they can be used as seals for plate type heat exchanger, as seals for electromagnetic valves in automatic dispensers, and the like.

Examples of the field of equipment in atomic power plants are packing, O-rings, hoses, sealing materials, diaphragms, valves, rolls, tubes and the like.

Examples of the field of steel making such as steel sheet processing facilities are rolls and the like, which can be used in steel sheet processing rolls and the like.

Examples of the field of general industry are packing, O-rings, hoses, sealing materials, diaphragms, valves, rolls, tubes, lining, mandrels, electric wire, flexible joints, belts, rubber plates, weather strips, rolls of PPC copying machine, roller blades, and belts, which are specifically used as seals of hydraulic equipment and lubrication machines, bearing seals, seals for windows and the other in dry cleaning, seals for apparatus of concentrating uranium hexafluoride, seal (vacuum) valves in cyclotrons, seals for automatic packing machine, diaphragms in pumps for analysis of sulfurous acid gas and chlorine gas in the air (environmental destruction measuring instruments), rolls and belts in printing machines, squeeze rolls for acid pickling, and the like.

Examples of the field of electricity, the sealing materials are specifically used such as insulation oil cups for super-express railway, benching seals in liquid-ring transformers, jackets in cables for oil wells, and the like.

In the field of fuel cells, the sealing materials are specifically used such as sealing materials between electrodes and separators, seals for piping for hydrogen, oxygen and generated water, and the like.

In the field of electronic parts, the sealing materials are specifically used in raw materials of ingredient for heating, raw materials of electromagnetic wave shielding materials, modifying materials for prepreg resins in printed wiring boards such as epoxy, shatter-resistant materials for such as electric lamps, gaskets for hard disk drives of computers.

Examples of the field of molded products that can be formed on-site are not especially limited. The sealing materials are specifically used such as coating agents of metallic gaskets for automobile engines, gaskets of oil pans in engines, rolls for copying machines and printers, sealing agents for the construction, gaskets for apparatus of magnetic recording, sealing agents of filter units for clean rooms, coating agents for printed boards, fixing agents for parts of electricity and electron, treatment for insulating and moisture-proof of the lead wire terminals in electrical equipment, seals for ovens such as electric furnaces, terminal treatment of sheath heaters, seals for window frames in microwave ovens, adhesion of CRT wedges and necks, adhesion of electrical parts in automobiles, joint seals for kitchens, bathrooms and lavatories.

Utilizing cleanness, the composition for curing of the present invention is particularly favorably used for a gasket for a magnetic storage equipment (hard disc drive), and a sealing material for a clean equipment such as a sealing material of a device storage etc such as a semiconductor manufacturing equipment and a wafer.

Utilizing properties such as chemical resistance, gas low permeability, and flame retardancy, the fluorine-containing elastomer composition of the present invention is particularly favorably used as a sealing material for a fuel battery such as packing used between fuel battery cell electrodes and its peripheral pipes.

Further, Since the fluorine-containing elastomer of the present invention has low fuel permeability, it can be favorably-used in the automobile industry, and particularly favorably used as parts contacting with fuel such as a fuel hose.

EXAMPLES

The present invention is explained in detail based on Examples in the following, but the invention is not limited only thereto.

<Vulcanization Properties>

A vulcanization curve at 170° C. is obtained by using Curastometer II manufactured by JSR Corporation during primary press vulcanization, and a minimum viscosity (ML), a vulcanization degree (MH), an induction time ($T_{10}$) and an optimal vulcanization time ($T_{90}$) are obtained.

<Mooney Viscosity>

A Mooney viscosity is measured in accordance with ASTM-D1646 and JIS K6300.

Measurement equipment: manufactured by ALPHA TECHNOLOGIES Inc., MV2000E

Rotor rotational speed: 2 rpm

Measurement temperature: 100° C., 121° C.

<Glass Transition Temperature>

A glass transition temperature of a crude rubber (elastomer component) is measured by a differential scanning calorimetry (DSC) using RDC220 manufacture by SII Nano Technology Inc.

<Compression Set>

An O-ring (P-24) is prepared by primary press vulcanizing and secondary oven vulcanizing compositions shown in Examples 1 to 4 under the following standard vulcanization conditions, and compression set after the primary press vulcanization and compression set (CS) after the secondary oven vulcanization are measured in accordance with JIS-K6262 (measured on a sample left in a room having a constant temperature at 25° C. for 30 minutes after maintaining under 25% pressurization and compression at 200° C. for 72 hours).

(Standard Vulcanization Conditions)

Kneading method: roll kneading

Primary press vulcanization: 15 minutes at 170° C., 6 MPa

Secondary oven vulcanization: 24 hours at 230° C.

<100% Modulus (M100)>

A sheet having a thickness of 2 mm is prepared by the compositions shown in Examples 1 to 4 by primary press vulcanization and secondary oven vulcanization under the standard vulcanization conditions, and a 100% modulus is measured in accordance with JIS-K6251.

<Tensile Strength at Break (Tb) and Tensile Elongation at Break (Eb)>

A sheet having a thickness of 2 mm is prepared by the compositions shown in Examples 1 to 4 by primary press vulcanization and secondary oven vulcanization under the standard vulcanization conditions, and tensile strength at break and tensile elongation at break are measured in accordance with JIS-K6251.

<Hardness>

A sheet having a thickness of 2 mm is prepared by the compositions shown in Examples 1 to 4 by primary press vulcanization and secondary oven vulcanization under the standard vulcanization conditions, and hardness is measured in accordance with JIS-K6253.

<Immersion Test>

Amount change and volume change are measured in accordance with JIS-K6258. A measurement temperature is 40° C., a test solvent is CE10 (toluene/isooctane/ethanol=45/45/10 (% by volume)).

<Fuel Permeability Test>

A stainless container having an inner diameter of 40 mm (cross sectional area: 12.56 cm$^2$) and a height of 60 mm is filled with 58 ml of fuel, using a sample in a form of a film having a thickness of 0.5 mm, the container is capped with an O-ring made of a fluorine rubber placed therein, and the lid is screwed down. A cup is upside down, in a state in which the sample and fuel are directly contacted placed in a constant temperature bath in which a set temperature can be controlled at ±1° C. A weight of the cup is measured by 24 hours, a value to be constant of (weight loss per hour×average thickness of a film)/(permeable area). A test temperature is 40° C., and fuel is CE10(toluene/isooctane/ethanol=45/45/10 (% by volume)).

Preparation Example 1

An autoclave made of SUS316 having 3 L-internal capacity was charged with 1.5 L of pure water and 1.5 g of ammonium perfluorooctanoate as an emulsifier, and after sufficiently replacing the reaction vessel with a nitrogen gas, a temperature was increased to 80° C. while stirring at 600 rpm, a monomer mixture of TFE/VdF/HFP (molar ratio of 18/7/75) was pressed in to have an inner pressure of 1.50 MPa. 2 mL of an aqueous solution of an ammonium persulfate (APS) having a concentration of 31.6 mg/mL was pressed in to initiate polymerization. Since a pressure was lowered along with proceeding a polymerization reaction, at the time when a pressure was lowered to 1.44 MPa, the reaction vessel was repressurized to 1.50 MPa with a monomer mixture of TFE/VdF/HFP (molar ratio of 36/31/33), at the time when 2% of a monomer charging amount in polymerization was charged, 2.69 g of I(CF$_2$CF$_2$)$_2$I which is a chain transfer agent was charged. 2 mL of the above-described APS aqueous solution was pressed into the polymerization vessel with a nitrogen gas after 3 hours, and after 6 hours from initiation of the reaction, thereafter, 1 mL of the above-described aqueous solution was pressed into the polymerization vessel with a nitrogen gas every 3 hours. A reaction was continued while repeating depressurization and pressurization of an internal pressure between 1.44 MPa and 1.50 MPa. The autoclave was cooled after 33.2 hours from the initiation of the reaction, and an unreacted monomer was released to obtain an aqueous emulsion having a solid content concentration of 24.4% by weight. 5% by weight of an aluminum persulfate solution was added to this aqueous emulsion to carry out coagulation, and a coagulate was washed out and dried to obtain 481 g of the fluorine-containing elastomer (a). As a result of $^{19}$F-NMR analysis, it was found that a composition of this elastomer was TFE/VdF/HFP=40.1/33.2/26.7 (% by mol) (fluorine amount: 72.5% by weight). In addition, it was impossible to measure a number average molecular weight of the fluorine-containing elastomer (a), and a Mooney viscosity at 100° C. was 40.

Preparation Example 2

An autoclave made of SUS316 having 2.6 L-internal capacity was charged with 1.59 L of pure water and 1.59 g of ammonium perfluorooctanoate as an emulsifier, and after sufficiently replacing the reaction vessel with a nitrogen gas, a temperature was increased to 95° C. while stirring at 600 rpm, a monomer mixture of TFE/VdF/HFP (molar ratio of Nov. 18, 1971) was pressed in to have an inner pressure of 1.18 MPa. Then, an APS aqueous solution having a concentration of 28.3 mg/mL was started charging at a ratio of 10.0 g/hr by using a plunger pump to initiate polymerization. APS was continued charging in the same ratio until polymerization termination. Since a pressure is lowered along with proceeding a polymerization reaction, at the time when a pressure is lowered to be 1.15 MPa, the reaction vessel was repressurized to be 1.18 MPa with a monomer mixture of TFE/VdF/HFP (molar ratio of 20/50/30), and the reaction was continued while repeating between decreasing and increasing a pressure. At the time when the total amount of a monomer charging amount is 31 g, 92 g, 153 g, 212 g, and 306 g from the initiation of the polymerization reaction, 0.073 cc, 0.073 cc, 0.146 cc, 0.146 cc and 0.146 cc of isopentane were respectively pressed in. At the time when the total monomer charging amount was 613 g (after 7.5 hours), the autoclave was cooled, and an unreacted monomer was released to obtain an aqueous emulsion having a solid content concentration of 26.7% by weight. 5% by weight of an aluminum persulfate solution was added to this aqueous emulsion to carry out coagulation, a coagulate was washed out and dried to obtain 605 g of the fluorine-containing elastomer (b). As a result of $^{19}$F-NMR analysis, it was found that a composition of this elastomer is TFE/VdF/HFP=20.3/49.4/30.3 (% by mol) (fluorine amount: 70.6% by weight). A number average molecular weight of the fluorine-containing elastomer (b) was 27,000, and a Mooney viscosity at 100° C. was 63.

Preparation Example 3

An autoclave made of SUS316 having 3 L-internal capacity was charged with 1.5 L of pure water, 1.5 g of ammonium perfluorooctanoate and 0.13 g of disodium hydrogen phosphate, and after sufficiently replacing the reaction vessel with a nitrogen gas, a temperature was increased to 80° C. while stirring at 600 rpm, a monomer mixture of TFE/VdF/HFP (molar ratio of Nov. 19, 1970) was pressed in to have an inner pressure of 1.50 MPa. 1 mL of an APS aqueous solution having a concentration of 21 mg/mL was pressed in to initiate polymerization. Since a pressure was lowered along with proceeding a polymerization reaction, at the time when a pressure was lowered to 1.44 MPa, the reaction vessel was repressurized to 1.50 MPa with a monomer mixture of TFE/VdF/HFP (molar ratio of 20/50/30), at the time when 2% of a monomer charging amount in polymerization was charged, 0.57 g of I(CF$_2$CF$_2$)$_2$I which is a chain transfer agent was charged. 1 mL of the above-described APS aqueous solution was pressed into the polymerization vessel with a nitrogen gas after 3 hours, and after 6 hours from initiation of the reaction, thereafter, 0.5 mL of the above-described aqueous solution was pressed into the polymerization vessel with a nitrogen gas every 3 hours. A reaction was continued while repeating depressurization and pressurization of an internal pressure between 1.44 MPa and 1.50 MPa. The autoclave was cooled after 9.7 hours from the initiation of the reaction, and an unreacted monomer was released to obtain an aqueous emulsion having a solid content concentration of 19.2% by weight. 5% by weight of an aluminum persulfate solution was added to this aqueous emulsion to carry out coagulation, and a coagulate was washed out and dried to obtain 337 g of the fluorine-containing elastomer (c). As a result of $^{19}$F-NMR analysis, it was found that a composition of this elastomer was TFE/VdF/HFP=20.0/49.5/30.5 (% by mol) (fluorine amount: 70.6% by weight). In addition, a number average molecular weight of the fluorine-containing elastomer (c) was 138,000, and a Mooney viscosity at 100° C. was 155.

Preparation Example 4

An autoclave made of SUS316 having 3 L-internal capacity was charged with 1.5 L of pure water, 1.5 g of ammonium perfluorooctanoate, and 0.13 g of disodium hydrogen phosphate, and after sufficiently replacing the reaction vessel with a nitrogen gas, a temperature was increased to 80° C. while stirring at 600 rpm, a monomer mixture of TFE/VdF/HFP (molar ratio of Nov. 19, 1970) was pressed in to have an inner pressure of 1.50 MPa. 2 mL of an APS aqueous solution having a concentration of 11.5 mg/mL was pressed in to initiate polymerization. Since a pressure was lowered along with proceeding a polymerization reaction, at the time when a pressure was lowered to 1.44 MPa, the reaction vessel was repressurized to 1.50 MPa with a monomer mixture of TFE/VdF/HFP (molar ratio of 20/50/30). At the time when 2% of a monomer charging amount in polymerization was charged, 4.66 g of $I(CF_2CF_2)_2I$ which is a chain transfer agent was charged. 2 mL of the above-described APS aqueous solution was pressed into the polymerization vessel with a nitrogen gas after 3 hours, and after 6 hours from initiation of the reaction, thereafter, 1 mL of the above-described APS aqueous solution was pressed into the polymerization vessel with a nitrogen gas every 3 hours, and a reaction was continued while repeating depressurization and pressurization of an internal pressure between 1.44 MPa and 1.50 MPa. The autoclave was cooled after 29.4 hours from the initiation of the reaction, and an unreacted monomer was released to obtain an aqueous emulsion having a solid content concentration of 25.5% by weight. 5% by weight of an aluminum persulfate solution was added to this aqueous emulsion to carry out coagulation, and a coagulate was washed out and dried to obtain 501 g of the fluorine-containing elastomer (d). As a result of $^{19}$F-NMR analysis, it was found that a composition of this elastomer was TFE/VdF/HFP=20.1/49.7/30.2 (% by mol) (fluorine amount: 70.6% by weight). In addition, a number average molecular weight of the fluorine-containing elastomer (d) was 46,000, and a Mooney viscosity at 100° C. was 14.

Example 1

Based on the total amount of 100 parts by weight of 10 parts by weight of the obtained fluorine-containing elastomer (a) in Preparation Example 1 and 90 parts by weight of the obtained fluorine-containing elastomer (b) in Preparation Example 2, 2 parts by weight of bisphenol AF, 0.55 part by weight of 8-benzyl-1,8-diazabicycro[5.4.0]-7-undecenium chloride (DBU—B), 20 parts by weight of MT-carbon black, 6 parts by weight of calcium hydroxide, and 3 parts by weight of high activated magnesium oxide were mixed, and a crosslinking fluorine-containing elastomer composition was prepared by kneading in a roll with general processes.

After this fluorine-containing elastomer composition was cured with primary press at 170° C.×15 minutes at 6 MPa, the composition was further oven-cured in an oven at 230° C. for 24 hours, and a molded article was obtained. Vulcanization properties of a molded article, compression set, 100% modulus (M100), tensile strength at break (Tb) and elongation strength at break (Eb), hardness (Hs), an immersion test, and a fuel permeability test were measured. Results were shown in Table 2.

Examples 2 and 3 and Comparative Examples 1 to 3

A molded article was obtained in the same process as Example 1, besides adjusting a fluorine-containing elastomer composition having a compounding ratio shown in Table 1. Vulcanization properties of a molded article, compression set, 100% modulus (M100), tensile strength at break (Tb) and elongation strength at break (Eb), hardness (Hs), an immersion test, and a fuel permeability test were measured. Results were shown in Table 2.

TABLE 1

|  | Ex. | | | Com. Ex. | | |
| --- | --- | --- | --- | --- | --- | --- |
|  | 1 | 2 | 3 | 1 | 2 | 3 |
| Formulations (phr) | | | | | | |
| Fluorine-containing elastomer (a) | 10 | 20 | 30 | 100 | | |
| Fluorine-containing elastomer (b) | 90 | 80 | 70 | | 100 | |
| Fluorine-containing elastomer (c) | | | | | | 40 |
| Fluorine-containing elastomer (d) | | | | | | 60 |
| Bisphenol AF | 2 | 2 | 2 | 2 | 2 | 2 |
| DBU-B | 0.55 | 0.55 | 0.55 | 0.55 | 0.55 | 0.6 |
| MT Carbon black | 20 | 20 | 20 | 20 | 20 | 20 |
| Calcium hydroxide | 6 | 6 | 6 | 6 | 6 | 6 |
| High activated magnesium oxide | 3 | 3 | 3 | 3 | 3 | 3 |
| Evaluation results | | | | | | |
| Glass transition temperature(° C.) | −4 | −3 | −3 | 6 | −4 | — |
| Lowest viscosity of full compound (Vm at 121° C.) | 76 | 70 | 63 | 26 | 85 | 50 |
| Mooney Viscosity of raw gum (at 100° C.) | 56 | 52 | 47 | 40 | 63 | 60 |

TABLE 2

|  | Ex. | | | Com. Ex. | | |
|---|---|---|---|---|---|---|
|  | 1 | 2 | 3 | 1 | 2 | 3 |
| Evaluation results | | | | | | |
| Vulcanization properties | | | | | | |
| Lowest viscosity (N) | 1.9 | 1.9 | 1.7 | | 2.5 | 1.9 |
| Vulcanization degree (N) | 15 | 13 | 11 | | 16 | 16 |
| Induction time (min.) | 5.1 | 5 | 4.2 | | 5.9 | 3.4 |
| Optimal vulcanization time (min.) | 8.4 | 8.4 | 7.8 | | 9.1 | 7.4 |
| Mechanical properties | | | | | | |
| 100% Modulus (MPa) | 4.2 | 5.0 | 5.2 | | 4.2 | 3.4 |
| Tensile strength (MPa) | 14 | 15 | 14 | | 15 | 13 |
| Elongation (%) | 285 | 295 | 285 | | 290 | 315 |
| Hardness (SHORE A) | 76 | 79 | 79 | | 75 | 76 |
| Compression set | | | | | | |
| 72 hours at 200° C. | 55 | 56 | 58 | | 60 | — |
| Immersion test CE10 at 40° C. | | | | | | |
| Weight change (%) | 4.6 | 4.2 | 4.2 | | 4.7 | 5.0 |
| Volume change (%) | 11.4 | 11.4 | 10.5 | | 11.7 | 12.7 |
| Fuel permeation rate (CE10 at 40° C.) (g · mm/day · m$^2$) | 10.8 | 10.1 | 9.2 | | 11.6 | 19.5 |

INDUSTRIAL APPLICABILITY

The fluorine-containing elastomer composition of the present invention contains a low molecular weight fluorine-containing elastomer composition having a fluorine amount of at least 67% by weight, since a fluorine amount of the low molecular weight fluorine-containing is larger than a fluorine amount of the fluorine-containing elastomer (A), a molded article excellent in processability, cold resistance, chemical resistance and strength, having small compression set (CS), and improved in fuel permeability can be obtained.

The invention claimed is:

1. A fluorine-containing composition comprising a fluorine-containing elastomer (A) and a fluorine-containing elastomer (B) having a lower molecular weight than the fluorine-containing elastomer (A), wherein the fluorine amount of the fluorine-containing elastomer (B) is larger than a fluorine amount of the fluorine-containing elastomer (A), the fluorine amount of the fluorine-containing elastomer (A) is at least 69% by weight to less than 71% by weight, the fluorine amount of the fluorine-containing elastomer (B) is at least 72% by weight to at most 76% by weight, and an amount of the fluorine-containing elastomer (B) is 0.1 to 90 parts by weight based on 100 parts by weight of the fluorine-containing elastomer (A).

2. The fluorine-containing elastomer composition of claim 1, wherein a Mooney viscosity of the fluorine-containing elastomer (B) at 100° C. is at most 60.

3. The fluorine-containing elastomer composition of claim 1, wherein a Mooney viscosity of the fluorine-containing elastomer composition at 121° C. is at most 90.

4. The fluorine-containing elastomer composition of claim 1, wherein a Mooney viscosity of the fluorine-containing elastomer composition at 121° C. is at most 82, and a fuel permeation rate of a fuel comprising 45% by volume of toluene, 45% by volume of isooctane and 10% by volume of ethanol at 40° C. is at most 18 g·mm/day·m$^2$.

5. The fluorine-containing elastomer composition of claim 1, wherein the fluorine-containing elastomer (A) is a vinylidene fluoride fluorine rubber.

6. The fluorine-containing elastomer composition of claim 1, further comprising a curing agent (C).

7. The fluorine-containing elastomer composition of claim 6, comprising a polyol curing agent as the curing agent (C).

8. A molded article, which is obtained by curing the flourine-containing elastomer composition of claim 1.

9. A fuel hose for an automobile, which is obtained by curing the fluorine-containing elastomer composition of claim 1.

* * * * *